United States Patent
Li

(10) Patent No.: US 11,454,967 B2
(45) Date of Patent: Sep. 27, 2022

(54) SYSTEMS AND METHODS FOR COLLECTING VEHICLE DATA TO TRAIN A MACHINE LEARNING MODEL TO IDENTIFY A DRIVING BEHAVIOR OR A VEHICLE ISSUE

(71) Applicant: Verizon Patent and Licensing Inc., Arlington, VA (US)

(72) Inventor: Wei Li, Selwyn District (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 505 days.

(21) Appl. No.: 16/689,731

(22) Filed: Nov. 20, 2019

(65) Prior Publication Data

US 2021/0149394 A1 May 20, 2021

(51) Int. Cl.
| | |
|---|---|
| G05D 1/00 | (2006.01) |
| G06N 20/00 | (2019.01) |
| G06N 5/04 | (2006.01) |
| G06N 5/00 | (2006.01) |
| G07C 5/02 | (2006.01) |
| H04L 43/08 | (2022.01) |
| G06Q 10/10 | (2012.01) |

(52) U.S. Cl.
CPC ......... *G05D 1/0061* (2013.01); *G05D 1/0088* (2013.01); *G06N 5/003* (2013.01); *G06N 5/04* (2013.01); *G06N 20/00* (2019.01); *G07C 5/02* (2013.01); *H04L 43/08* (2013.01); *G05D 2201/0213* (2013.01); *G06Q 10/1097* (2013.01)

(58) Field of Classification Search
CPC .............. G05D 1/0061; G05D 1/0088; G05D 2201/0213; G06N 5/003; G06N 5/04; G06N 20/00; G06N 20/20; G07C 5/02; G07C 5/0808; G07C 5/0816; H04L 43/08; H04L 41/16; H04L 43/0852; H04L 43/0876; H04L 43/0888; H04L 43/0894; H04L 43/065; H04L 43/024; G06Q 10/1097
USPC ......................................................... 701/27
See application file for complete search history.

(56) References Cited

U.S. PATENT DOCUMENTS

| | | | | |
|---|---|---|---|---|
| 2020/0249028 | A1* | 8/2020 | Fridin | G01S 5/019 |
| 2021/0049837 | A1* | 2/2021 | Karnik | B60R 21/01 |
| 2021/0125423 | A1* | 4/2021 | Isaac | G07C 5/008 |
| 2021/0149394 | A1* | 5/2021 | Li | G05D 1/0061 |
| 2022/0107651 | A1* | 4/2022 | Elluswamy | G06V 20/588 |
| 2022/0161815 | A1* | 5/2022 | Van Beek | G06T 9/00 |

* cited by examiner

*Primary Examiner* — Hirdepal Singh

(57) ABSTRACT

A device receives network constraints associated with a network connected to a vehicle device, data collection constraints, and vehicle device constraints. The device determines a first sampling rate, a first time period, a second sampling rate, and a second time period for collecting vehicle data based on the network constraints, the data collection constraints, and the vehicle device constraints, wherein the first sampling rate is different than the second sampling rate. The device receives first vehicle data, provided at the first sampling rate and for the first time period, and second vehicle data, provided at the second sampling rate and for the second time period, and processes the first and second vehicle data, with a machine learning model, to identify a driving behavior or a vehicle issue. The device performs one or more actions based on the driving behavior or the vehicle issue.

20 Claims, 11 Drawing Sheets

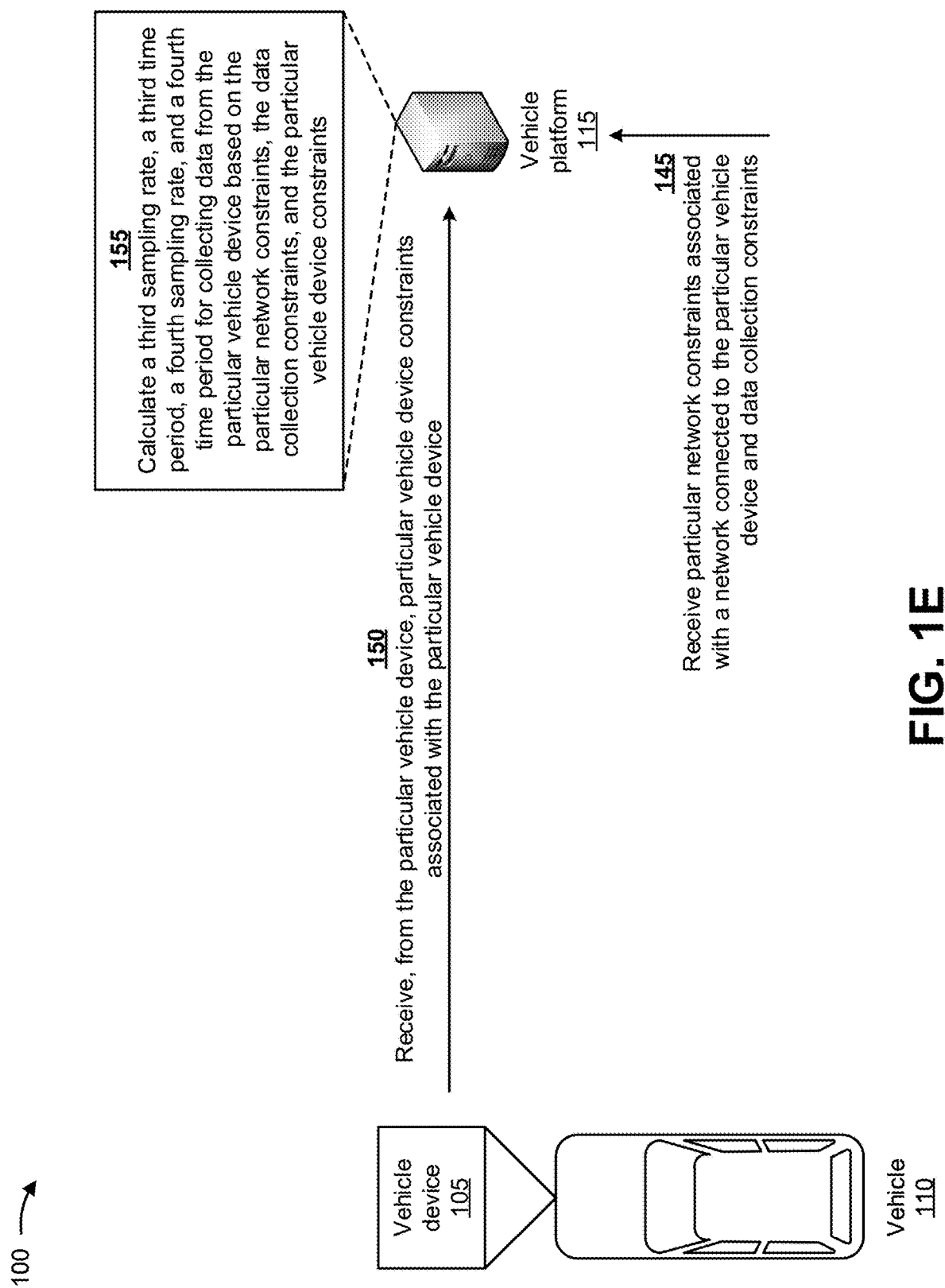

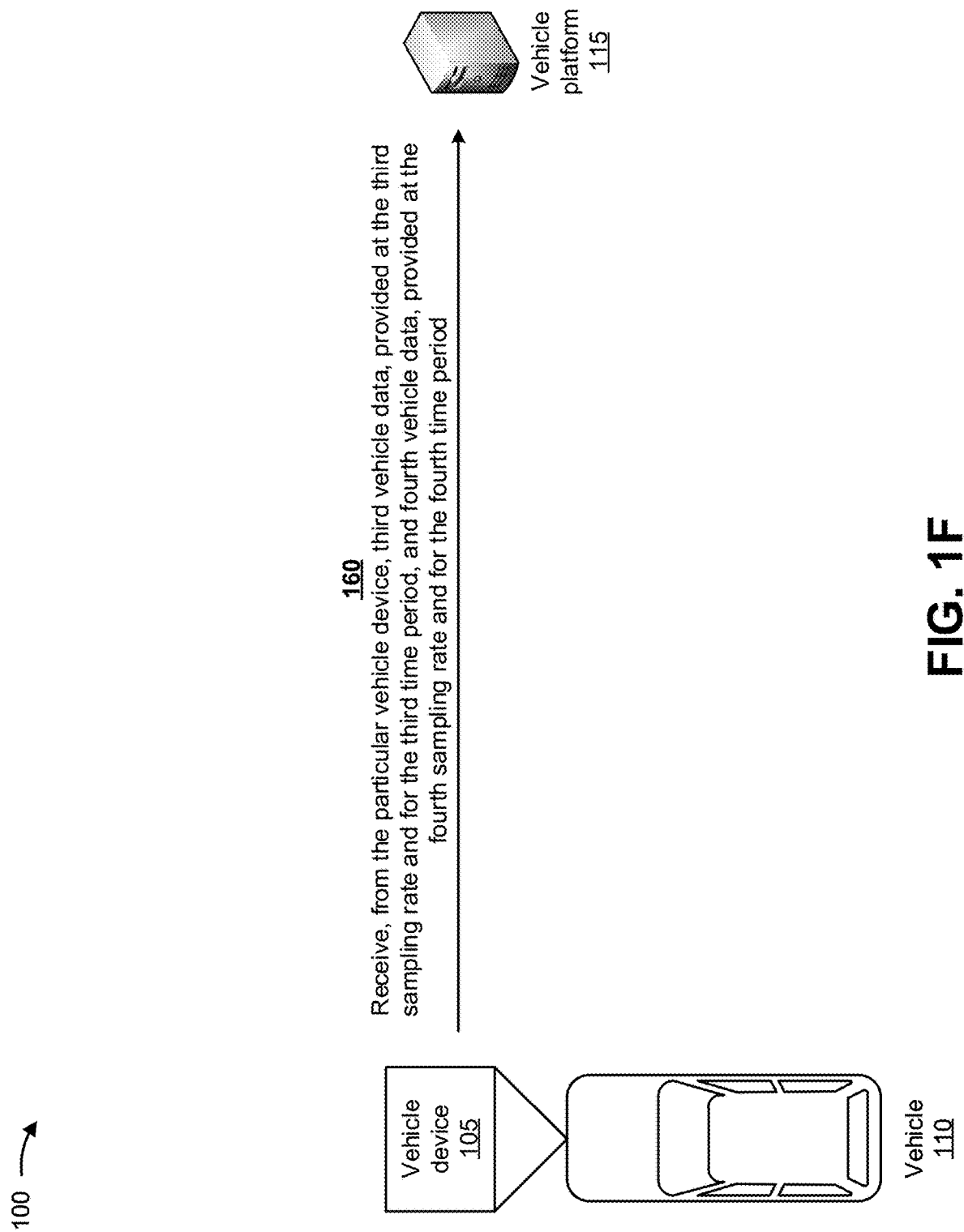

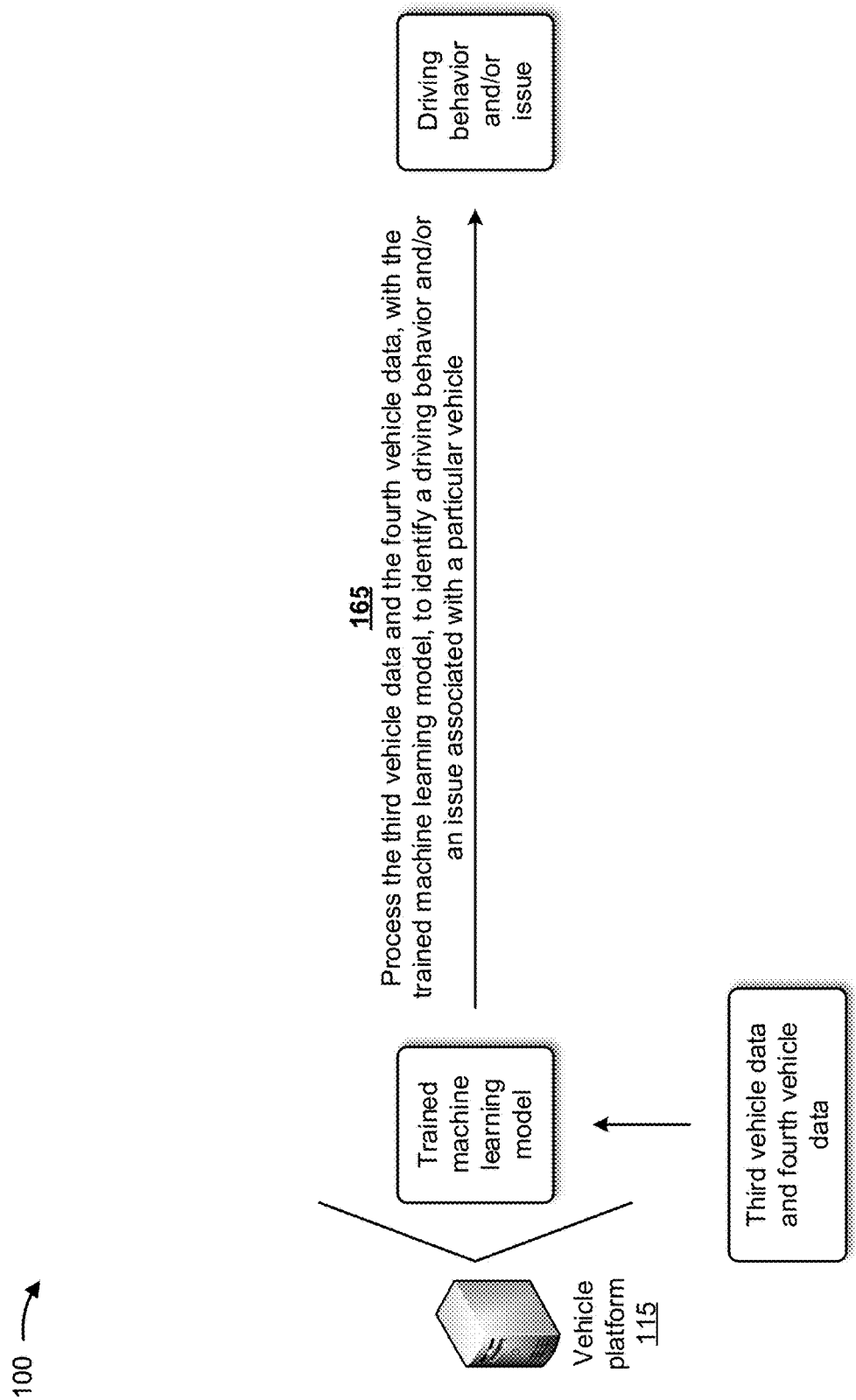

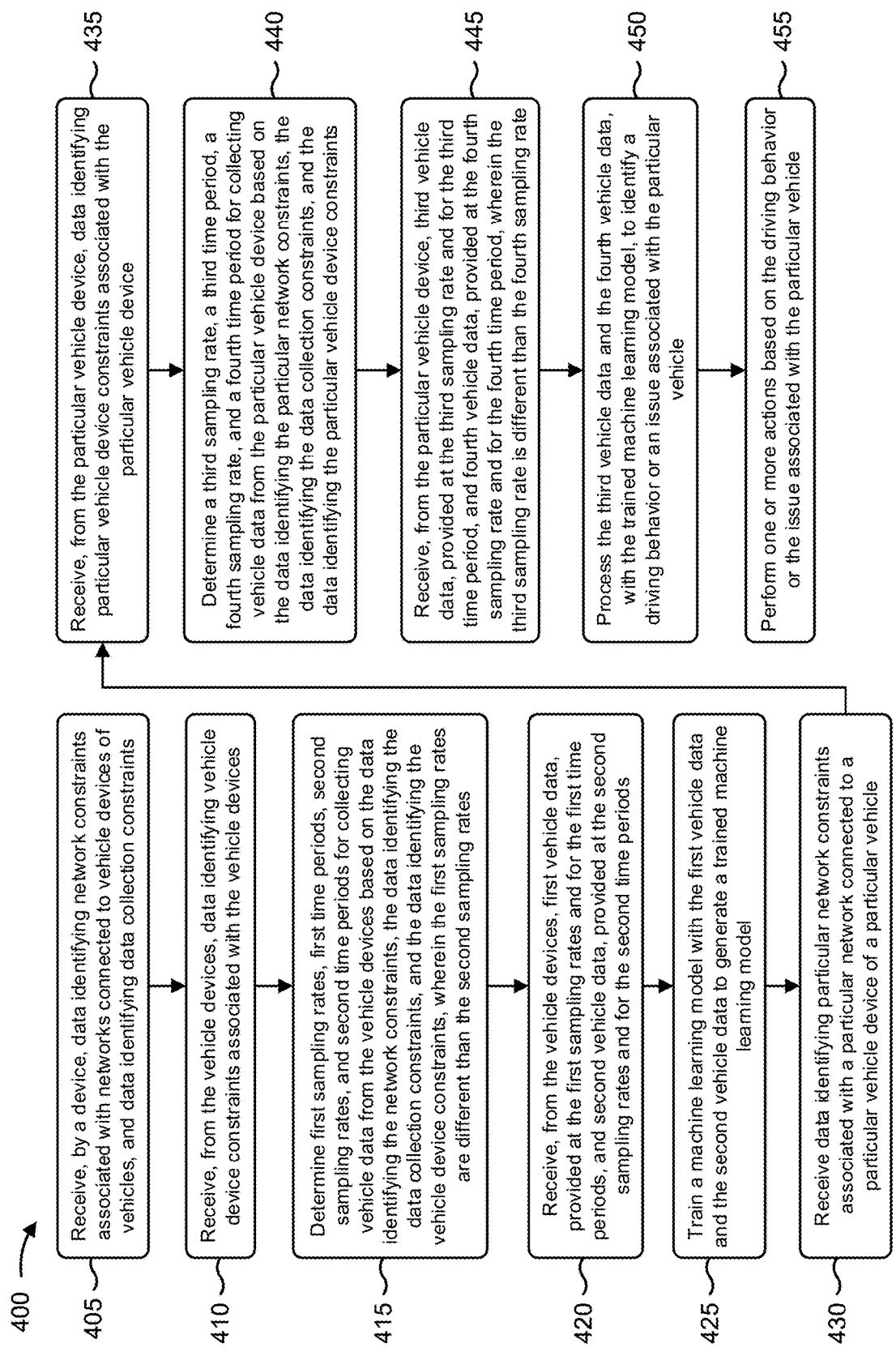

SYSTEMS AND METHODS FOR COLLECTING VEHICLE DATA TO TRAIN A MACHINE LEARNING MODEL TO IDENTIFY A DRIVING BEHAVIOR OR A VEHICLE ISSUE

BACKGROUND

Vehicles are equipped with several vehicle devices that enable capture of sensor data, such as images or video surrounding the vehicle, engine parameters, vehicle operation parameters, and/or the like. For example, a vehicle may include a dash camera, several parking assist cameras, a backup assist camera, an on-board diagnostic (OBD) device, an electronic control unit (ECU), and/or the like that enable capture of sensor data for different purposes.

BRIEF DESCRIPTION OF THE DRAWINGS

FIGS. 1A-1H are diagrams of one or more example implementations described herein.

FIG. 4 is a flow chart of an example process for collecting vehicle data to train a machine learning model to identify a driving behavior or a vehicle issue.

DETAILED DESCRIPTION OF PREFERRED EMBODIMENTS

Figure 1A:
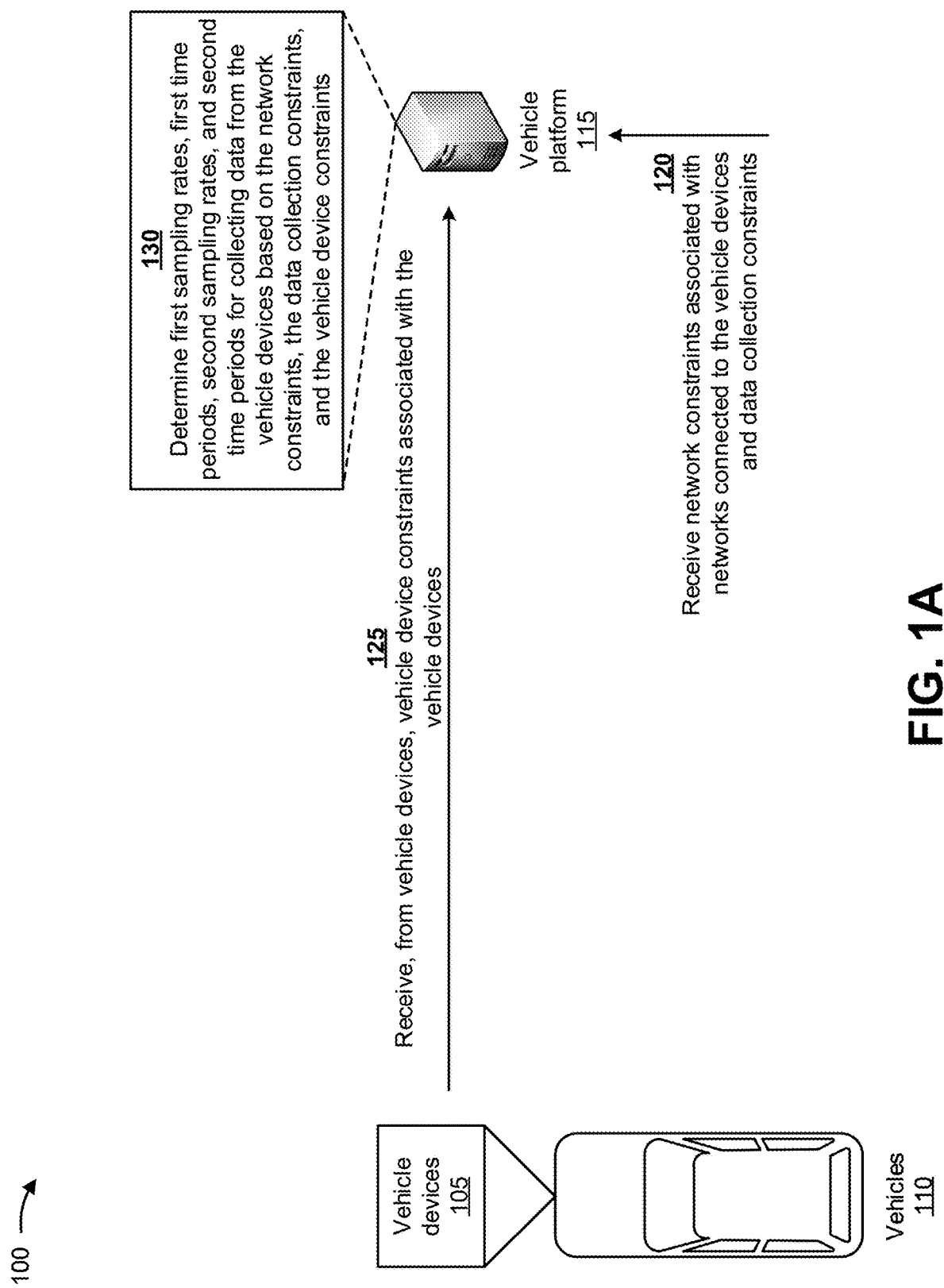

The following detailed description of example implementations refers to the accompanying drawings. The same reference numbers in different drawings may identify the same or similar elements.

Vehicle devices may capture vehicle data (e.g., images or video, vehicle operation data, vehicle diagnostic data, and/or the like) for specific purposes based on instructions received from an OBD device, an ECU, and/or the like of the vehicle. For example, the vehicle devices may cause vehicle data, such as global positioning system (GPS) data (e.g., a longitude, a latitude, a speed, a heading direction, and/or the like), odometer data, engine speed data, vehicle speed data, engine torque data, and/or the like to be captured. Such vehicle data may be utilized by separate systems to analyze the vehicle and/or operation of the vehicle (e.g., driving behavior). However, such vehicle data may be voluminous and difficult to share over a network with limited bandwidth, and sensors collecting the vehicle data may have a limited battery life.

Current techniques must maintain a balance between a quantity of vehicle data to collect and sensor capabilities, system processing capabilities, network connection availabilities, and/or the like. For example, current techniques may greatly reduce data collection (e.g., sampling frequency) to provide a realistic and affordable vehicle data collection and processing solution. However, such reduced data collection may not fully utilize capabilities of vehicle devices and may prevent discovery of details and/or characteristics in the vehicle data. Thus, current techniques waste computing resources (e.g., processing resources, memory resources, communication resources, and/or the like), networking resources, and/or the like associated with capturing vehicle data, transmitting the vehicle data, storing the vehicle data, processing the vehicle data, and/or the like.

Some implementations described herein provide a vehicle platform that collects vehicle data to train a machine learning model to identify a driving behavior or a vehicle issue. For example, the vehicle platform may receive data identifying network constraints associated with networks connected to vehicle devices of vehicles, and data identifying data collection constraints, and may receive, from the vehicle devices, data identifying vehicle device constraints associated with the vehicle devices. The vehicle platform may determine first sampling rates, first time periods, second sampling rates, and second time periods for collecting vehicle data from the vehicle devices based on the data identifying the network constraints, the data identifying the data collection constraints, and the data identifying the vehicle device constraints, wherein the first sampling rates may be different than the second sampling rates. The vehicle platform may receive, from the vehicle devices, first vehicle data, provided at the first sampling rates and for the first time periods, and second vehicle data, provided at the second sampling rates and for the second time periods, and may train a machine learning model with the first vehicle data and the second vehicle data to generate a trained machine learning model. The vehicle platform may receive data identifying particular network constraints associated with a particular network connected to a particular vehicle device of a particular vehicle, and may receive, from the particular vehicle device, data identifying particular vehicle device constraints associated with the particular vehicle device. The vehicle platform may determine a third sampling rate, a third time period, a fourth sampling rate, and a fourth time period for collecting vehicle data from the particular vehicle device based on the data identifying the particular network constraints, the data identifying the data collection constraints, and the data identifying the particular vehicle device constraints. The vehicle platform may receive, from the particular vehicle device, third vehicle data, provided at the third sampling rate and for the third time period, and fourth vehicle data, provided at the fourth sampling rate and for the fourth time period, wherein the third sampling rate may be different than the fourth sampling rate. The vehicle platform may process the third vehicle data and the fourth vehicle data, with the trained machine learning model, to identify a driving behavior or an issue associated with the particular vehicle, and may perform one or more actions based on the driving behavior or the issue associated with the particular vehicle.

In this way, the vehicle platform collects vehicle data to train a machine learning model to identify a driving behavior or a vehicle issue, which reduces a quantity of vehicle data that is collected, transmitted, stored, processed, and/or the like. Thus, the vehicle platform conserves computing resources (e.g., processing resources, memory resources, communication resources, and/or the like), networking resources, and/or the like that would otherwise be wasted in capturing vehicle data, transmitting the vehicle data, storing the vehicle data, processing the vehicle data, and/or the like.

FIGS. 1A-1H are diagrams of one or more example implementations 100 described herein. As shown in FIG. 1A, vehicle devices 105 may be associated with vehicles 110 and a vehicle platform 115. In some implementations, vehicle devices 105 may include devices (e.g., OBD devices, ECUs, and/or the like) that receive vehicle data (e.g., data indicating acceleration, speed, movement, and/or the like) and control other vehicle devices, vehicle sensors that capture the vehicle data, devices (e.g., dash cameras, parking assist cameras, backup assist cameras, and/or the like) that capture images or video, and/or the like associated with vehicles 110. Vehicle platform 115 may include a platform that collects vehicle data (e.g., from vehicle devices 105) that is used to train a machine learning model to identify a driving behavior or a vehicle issue.

As further shown in FIG. 1A, and by reference number 120, vehicle platform 115 may receive network constraints associated with one or more networks connected to vehicle devices 105, and may receive data collection constraints. In some implementations, vehicle platform 115 may periodically receive the network constraints and the data collection constraints, may continuously receive the network constraints and the data collection constraints, may receive the network constraints and the data collection constraints based on a request, and/or the like. In some implementations, vehicle platform 115 may store the network constraints and the data collection constraints in a data structure (e.g., a database, a table, a list, and/or the like) associated with vehicle platform 115.

In some implementations, the network constraints may include data identifying capabilities and/or capacities of the one or more networks to transmit vehicle data from vehicle devices 105 to vehicle platform 115. For example, the network constraints may include data identifying network traffic loads associated with the one or more networks, bandwidths of the one or more networks, throughputs of the one or more networks, latencies of the one or more networks, and/or the like. In some implementations, the data collection constraints may include data identifying a capability and/or a capacity of vehicle platform 115 to collect vehicle data, such as vehicle data obtained, via the one or more networks, from vehicle devices 105. For example, the data collection constraints may include data identifying processing capabilities, memory capabilities, communication capabilities, and/or the like of vehicle platform 115.

As further shown in FIG. 1A, and by reference number 125, vehicle platform 115 may receive, from vehicle devices 105, vehicle device constraints associated with vehicle devices 105. In some implementations, vehicle platform 115 may periodically receive the vehicle device constraints, may continuously receive the vehicle device constraints, may receive the vehicle device constraints based on a request, and/or the like. In some implementations, vehicle platform 115 may store the vehicle device constraints in a data structure (e.g., a database, a table, a list, and/or the like) associated with vehicle platform 115.

In some implementations, the vehicle device constraints may include data identifying capabilities and/or capacities of vehicle devices 105 to monitor, collect, transmit, and/or the like vehicle data captured by vehicle devices 105 and provided to vehicle platform 115. For example, the vehicle device constraints may include data identifying battery lives of batteries powering vehicle devices 105, data transmission rates of vehicle devices 105, average battery consumption limitations of the batteries of vehicle devices 105, and/or the like.

As further shown in FIG. 1A, and by reference number 130, vehicle platform 115 may determine first sampling rates, first time periods, second sampling rates, and second time periods for collecting data from vehicle devices 105 based on the network constraints, the data collection constraints, and the vehicle device constraints. In some implementations, the first sampling rates may be different than the second sampling rates, and a quantity of data points captured using the first sampling rates may be different than a quantity of data points captured using the second sampling rates. In some implementations, the first sampling rates may be greater than the second sampling rates, and a quantity of data points captured using the first sampling rates may be greater than a quantity of data points captured using the second sampling rates. For example, the first sampling rates may include a sampling rate of ten data points per second and the second sampling rates may include a sampling rate of one data point per second. Thus, in one minute (or sixty seconds), six-hundred data points may be collected using the first sampling rates, and sixty data points may be collected using the second sampling rates.

Figure 1B:
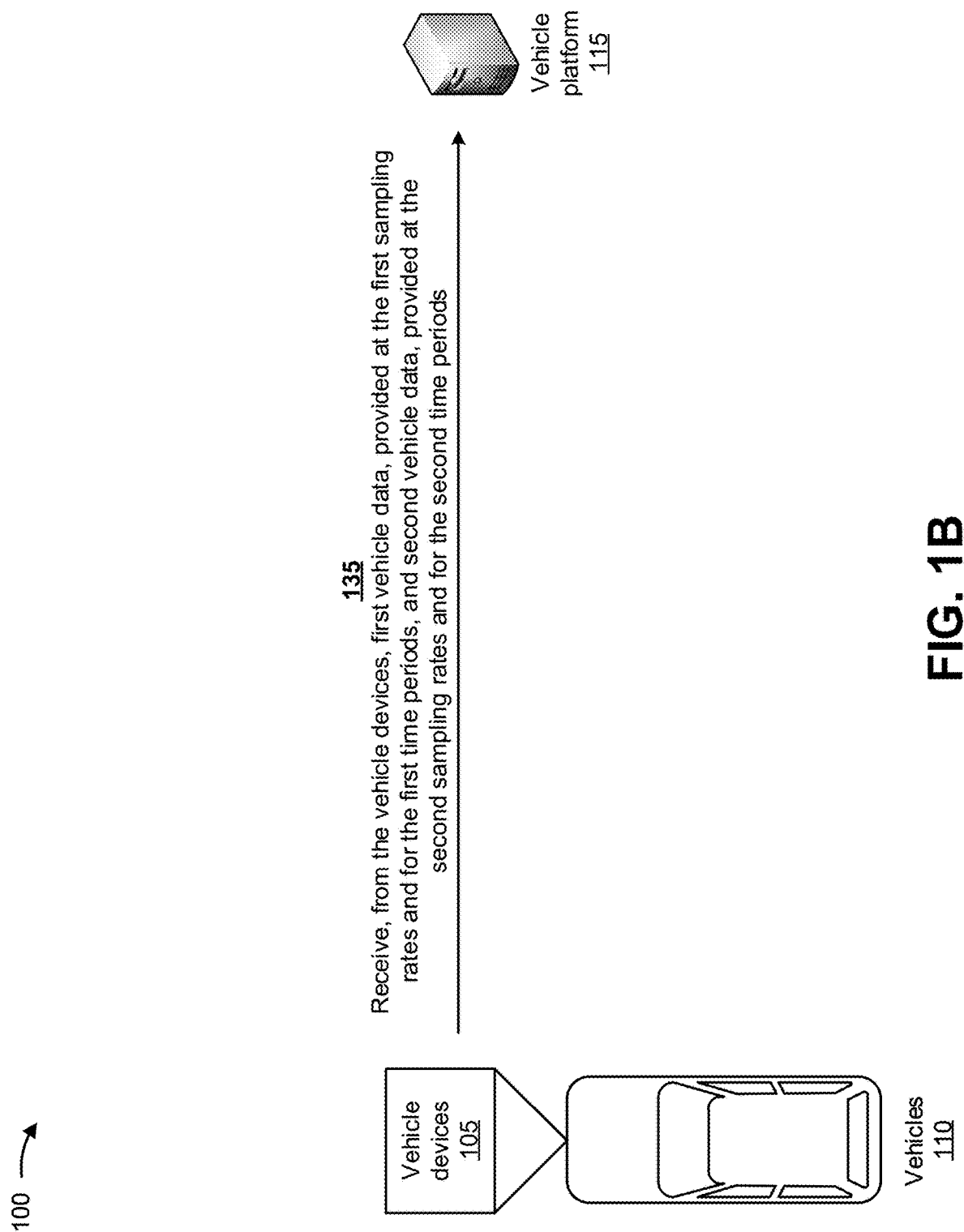

As shown in FIG. 1B, and by reference number 135, vehicle platform 115 may receive, from vehicle devices 105, first vehicle data, provided at the first sampling rates and for the first time periods, and second vehicle data, provided at the second sampling rates and for the second time periods. For example, if the first sampling rates capture fifty data points per second and the first time periods are five seconds, the first vehicle data may include two-hundred and fifty data points for each first time period. If the second sampling rates capture one data point per thirty seconds and the second time periods are sixty seconds, the second vehicle data may include two data points for each second time period. In some implementations, vehicle platform 115 may store the first vehicle data and second vehicle data in a data structure (e.g., a database, a table, a list, and/or the like) associated with vehicle platform 115.

In some implementations, the first vehicle data and the second vehicle data may include data identifying global positioning system (GPS) data (e.g., coordinates, longitude, latitude, heading, direction, and/or the like), odometer readings, engine speeds, vehicle speeds, engine torques, lateral accelerations, brake pedal switch counts, brake pedal times while moving, brake pedal times, driver seatbelt fastened indicators, fuel consumptions (e.g., fuel level, fuel remaining, fuel rate, and/or the like), fluid (e.g., engine oil, transmission fluid, and/or the like) levels, tire pressures, battery voltages, manifold pressures, fuel rail pressures, exhaust fluid levels, total engine hours, and/or the like associated with vehicles 110.

In some implementations, the first vehicle data may be compressed prior to being transmitted by vehicle devices 105. For example, one or more of vehicle devices 105 may utilize one or more data compression models to compress the first vehicle data. In some implementations, the data compression models may optimize the first vehicle data for transmission at the first sampling rate in order to reduce overall network traffic. In some implementations, the first vehicle data and the second vehicle data may be different for different vehicle devices 105. For example, a first vehicle device 105 may utilize a first time period that is different than a first time period utilized by a second vehicle device 105, the first vehicle device 105 may utilize a first sampling rate that is different than a first sampling rate utilized by the second vehicle device 105, and/or the like.

In some implementations, the first time periods and/or the second time periods may be of fixed durations. For example, the first time periods may last for fixed amounts of time (e.g., five seconds, ten seconds, thirty seconds, one minute, and/or the like) and the second time periods may last for the same or different fixed amounts of time (e.g., twenty seconds, forty seconds, two minutes, and/or the like). In some implementations, the first time periods and/or the second periods may be of irregular durations. For example, the first time periods and/or the second time periods may vary in a range of time periods. In some implementations, the first sampling rates and the second sampling rates may be fixed rates. For example, the first sampling rates may be set to a first fixed rate (e.g., ten data points per second, twenty data points per second, sixty data points per second, and/or the like) and the second sampling rates may be set to a second fixed rate that is less than the first fixed rate (e.g., one data point per second, two data points per second, and/or the like).

In some implementations, each of the first time periods may occur before each of the second time periods. In some implementations, sampling rates (e.g., the first sampling rates and the second sampling rates) and/or time periods (e.g., the first time periods and/or the second time periods) may be hard-coded into vehicle devices 105. Additionally, or alternatively, the sampling rates and/or the time periods may be configurable (e.g., selectable, set to a default value that can be changed, set by vehicle platform 115, set by vehicle devices 105, and/or the like).

Figure 1C:
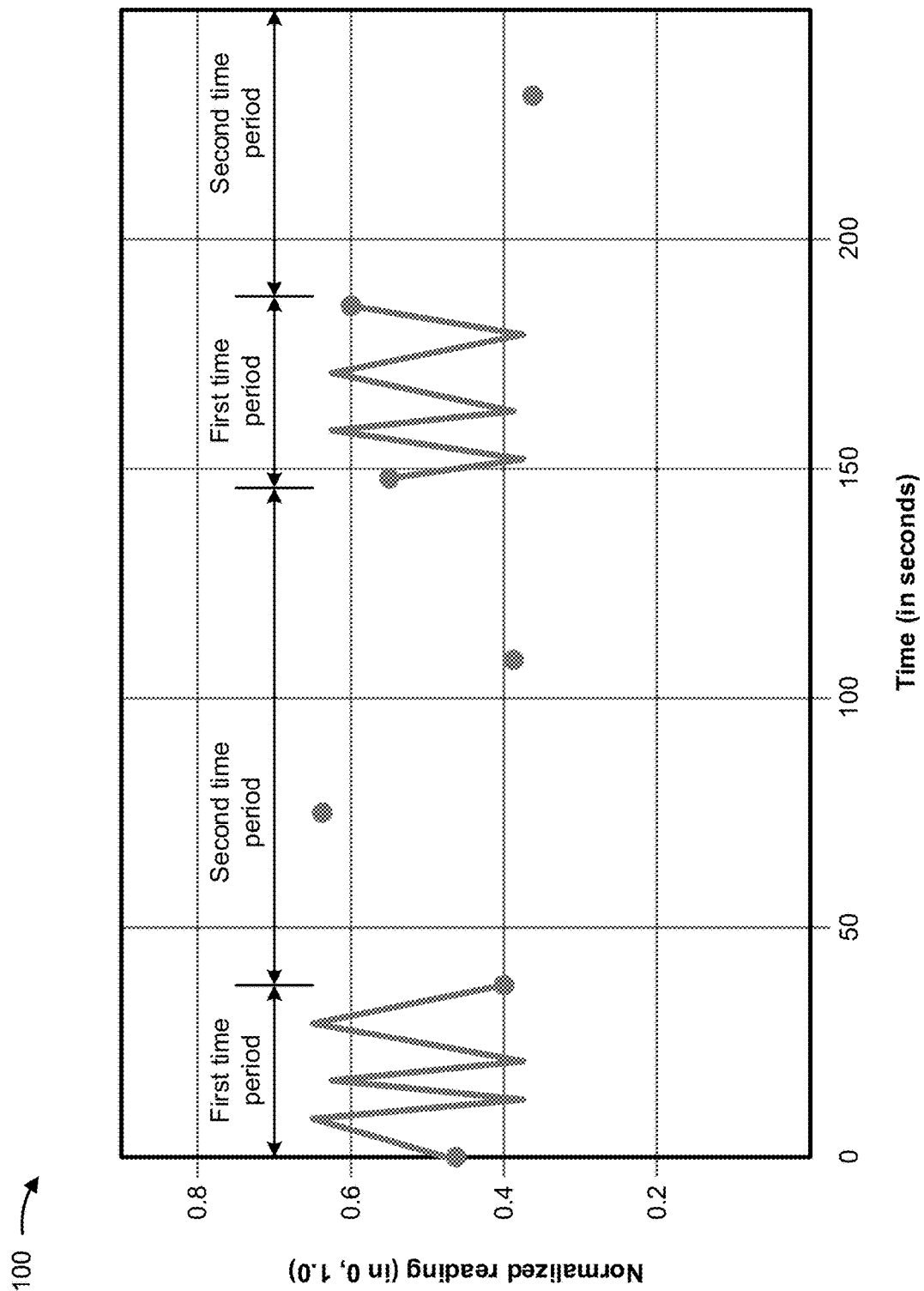

FIG. 1C is an example illustration of the first vehicle data and the second vehicle data (e.g., as represented by a normalized reading between 0.0 and 1.0) provided by one of vehicle devices 105 to vehicle platform 115 over a period of time (e.g., measured in seconds). As shown, the first vehicle data may be provided over a first time period (e.g., for forty seconds, as shown between zero and forty seconds) at the first sampling rate, and the second vehicle data may be provided over a second time period (e.g., for one-hundred and five seconds, as shown between forty and one-hundred and forty-five seconds) at the second sampling rate (e.g., that is less frequent than the first sampling rate. As further shown, the first vehicle data may be provided over the first time period again (e.g., for forty seconds, as shown between one-hundred and forty-five and one-hundred and eighty-five seconds) at the first sampling rate, and a portion of the second vehicle data may be provided over the second time period again (e.g., for sixty-five seconds, as shown between one-hundred and eighty-five seconds and two-hundred and fifty seconds) at the second sampling rate.

In some implementations, the sampling rates, the time periods, and/or intervals between the time periods, associated with the first vehicle and the second vehicle data shown in FIG. 1C, may be determined based on the network constraints, battery limitations associated with vehicle devices 105, time granularity required to represent the first vehicle data and the second vehicle data, data compression efficiency of vehicle devices 105, and/or the like. The sampling rates, the time periods, and/or the intervals between the time periods may be adjusted based on various factors. For example, intervals between the first time periods (e.g., having a higher sampling rate than the sampling rate associated with the second time periods) may be extended when a battery level is low in vehicle device 105, when network bandwidth is low, when network connectivity is poor, and/or the like.

Figure 1D:
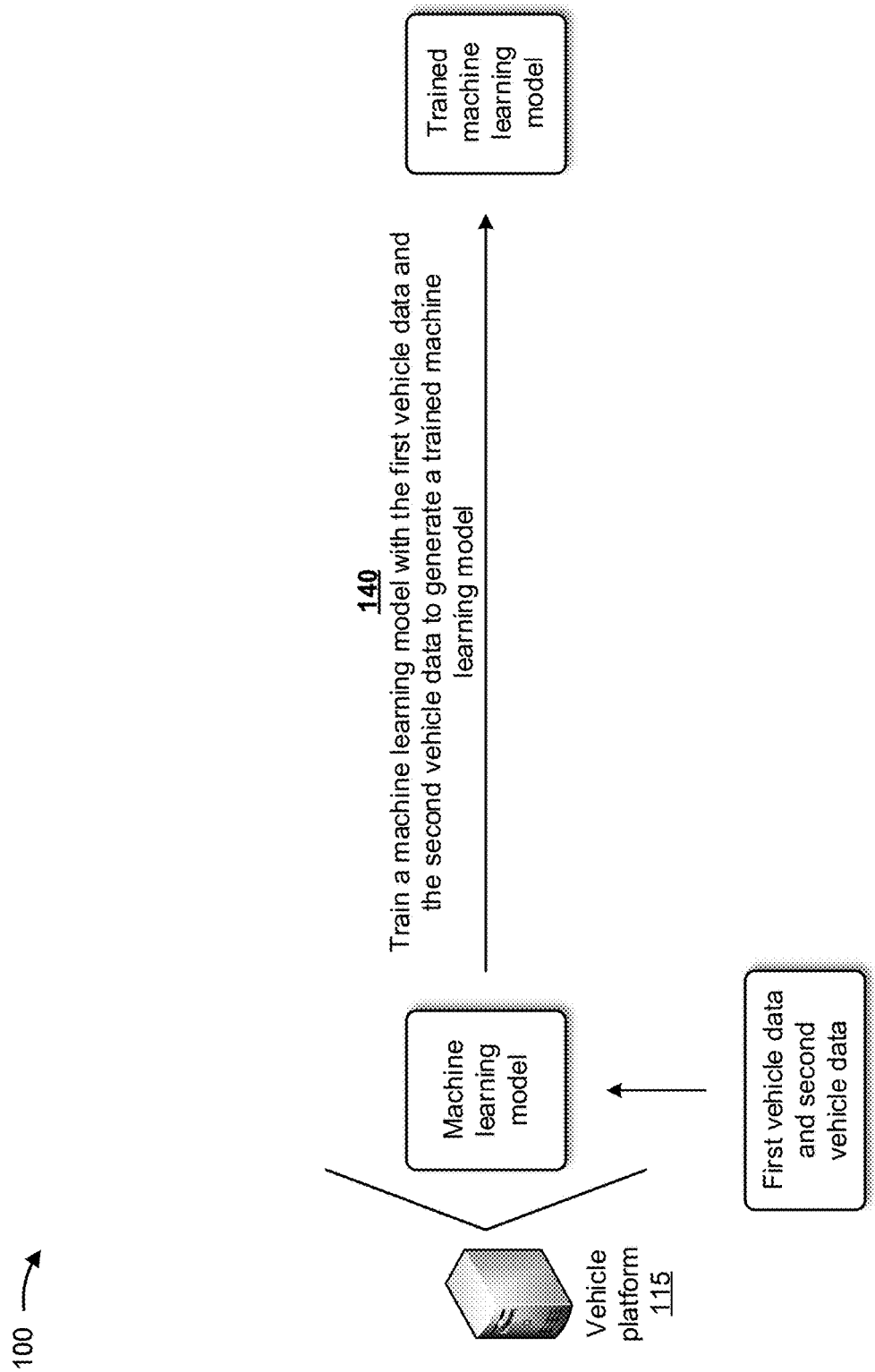

As shown in FIG. 1D, and by reference number 140, vehicle platform 115 may train a machine learning model with the first vehicle data and the second vehicle data to generate a trained machine learning model. In some implementations, vehicle platform 115 may train a first machine learning model with the first vehicle data to generate a trained first machine learning mode, and may train a second machine learning model with the second vehicle data to generate a trained second machine learning model. In some implementations, vehicle platform 115 may generate a trained machine learning model that identifies driving behavior associated with a particular vehicle 110, an issue associated with the particular vehicle 110, and/or the like. In some implementations, the machine learning model may include a random forest machine learning model.

In some implementations, the first vehicle data and the second vehicle data may be considered first historical vehicle data and second historical vehicle data, respectively, that is used to train the machine learning model. In some implementations, vehicle platform 115 may separate the first vehicle data and the second vehicle data into a training set, a validation set, a test set, and/or the like. The training set may be utilized to train the machine learning model. The validation set may be utilized to validate results of the trained machine learning model. The test set may be utilized to test operation of the machine learning model.

In some implementations, vehicle platform 115 may train the machine learning model using, for example, an unsupervised training procedure and based on the first vehicle data, the second vehicle data, and/or both the first vehicle data and the second vehicle data. For example, vehicle platform 115 may perform dimensionality reduction to reduce the first vehicle data and the second vehicle data to a minimum feature set, thereby reducing resources (e.g., processing resources, memory resources, and/or the like) to train the machine learning model, and may apply a classification technique to the minimum feature set.

In some implementations, vehicle platform 115 may use a logistic regression classification technique to determine a categorical outcome (e.g., that the first vehicle data and the second vehicle data indicate particular driving behaviors and/or vehicle issues). Additionally, or alternatively, vehicle platform 115 may use a naïve Bayesian classifier technique. In this case, vehicle platform 115 may perform binary recursive partitioning to split the first vehicle data and the second vehicle data into partitions and/or branches and use the partitions and/or branches to determine outcomes (e.g., that the first vehicle data and the second vehicle data indicate particular driving behaviors and/or vehicle issues). Based on using recursive partitioning, vehicle platform 115 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, vehicle platform 115 may use a support vector machine (SVM) classifier technique to generate a non-linear boundary between data points in the training set. In this case, the non-linear boundary is used to classify test data into a particular class.

Additionally, or alternatively, vehicle platform 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, vehicle platform 115 may use one or more other model training techniques, such as a neural network technique, a latent semantic indexing technique, and/or the like. For example, vehicle platform 115 may perform an artificial neural network processing technique (e.g., using a two-layer feedforward neural network architecture, a three-layer feedforward neural network architecture, and/or the like) to perform pattern recognition with regard to patterns of the first vehicle data and the second vehicle data. In this case, using the artificial neural network processing technique may improve an accuracy of the trained machine learning model generated by vehicle platform 115 by being more robust to noisy, imprecise, or incomplete data, and by enabling vehicle platform 115 to detect patterns and/or trends undetectable to human analysts or systems using less complex techniques.

In some implementations, rather than training the machine learning model, vehicle platform 115 may receive a trained machine learning model from another device (e.g., a server device). For example, a server device may generate the trained machine learning model based on having trained the machine learning model in a manner similar to that described above, and may provide the trained machine learning model to vehicle platform 115 (e.g., may pre-load vehicle platform 115 with the trained machine learning model, may receive a request from vehicle platform 115 for the trained machine learning models, and/or the like).

As shown in FIG. 1E, and by reference number 145, vehicle platform 115 may receive particular network constraints associated with a network connected to a particular vehicle device 105 (e.g., of a particular vehicle 110), and may receive data collection constraints. The particular network constraints may include data identifying a capability and/or a capacity of the network to transmit vehicle data from the particular vehicle device 105 to vehicle platform 115. For example, the particular network constraints may include data identifying a network traffic load associated with the network, a bandwidth of the network, a throughput of the network, a latency of the network, and/or the like. The data collection constraints may include data identifying a capability and/or a capacity of vehicle platform 115 to collect vehicle data, as described above in connection with FIG. 1A.

As further shown in FIG. 1E, and by reference number 150, vehicle platform 115 may receive, from the particular vehicle device 105, particular vehicle device constraints associated with the particular vehicle device 105. The particular vehicle device constraints may include data identifying a capability and/or a capacity of vehicle device 105 to monitor, collect, transmit, and/or the like vehicle data to vehicle platform 115. For example, the particular vehicle device constraints may include a battery life of a battery powering the particular vehicle device 105, a data transmission rate of the particular vehicle device 105, an average battery consumption limitation of the battery powering the particular vehicle device 105, and/or the like.

As further shown in FIG. 1E, and by reference number 155, vehicle platform 115 may calculate a third sampling rate, a third time period, a fourth sampling rate, and a fourth time period for collecting vehicle data from the particular vehicle device 105 based on the particular network constraints, the data collection constraints, and the particular vehicle device constraints. In some implementations, the third sampling rate may be different from the fourth sampling rate. For example, the third sampling rate may be greater than the fourth sampling rate, and a quantity of data points captured using the third sampling rate may be greater than a quantity of data points captured using the fourth sample rate.

As shown in FIG. 1F, and by reference number 160, vehicle platform 115 may receive, from the particular vehicle device 105 of the particular vehicle 110, third vehicle data, provided at the third sampling rate and for the third time period, and fourth vehicle data, provided at the fourth sampling rate and for the fourth time period.

In some implementations, the third vehicle data and the fourth vehicle data may include data identifying GPS data (e.g., coordinates, longitude, latitude, heading, direction, and/or the like), an odometer reading, an engine speed, a vehicle speed, an engine torque, a lateral acceleration, a brake pedal switch count, a brake pedal time while moving, a brake pedal time, a driver seatbelt fastened indicator, fuel consumption, fluid levels, tire pressure, a battery voltage, a manifold pressure, a fuel rail pressure, an exhaust fluid level, total engine hours, and/or the like associated with the particular vehicle 110.

In some implementations, the third vehicle data may be compressed prior to being transmitted by vehicle devices 105 to vehicle platform 115. For example, the particular vehicle device 105 may employ one or more data compression algorithms to compress the third vehicle data, optimize the third vehicle data for transmission, reduce overall network traffic, and/or the like. In some implementations, the third sampling rate, the fourth sampling rate, the third time period, and/or the fourth time period may be hard-coded into the particular vehicle device. Additionally, or alternatively, the third sampling rate, the fourth sampling rate, the third time period, and/or the fourth time period may be configurable (e.g., selectable, set to a default value that can be changed, set by vehicle platform 115, set by the particular vehicle device 105, and/or the like).

In some implementations, the third time period and/or the fourth time period may be of fixed durations, irregular durations, and/or the like. In some implementations, the third sampling rate and the fourth sampling rate may be fixed rates, where the third sampling rate may be set to a third fixed rate and the fourth sampling rate may be set to a fourth fixed rate that is less than the third fixed rate. In some implementations, the third time period may occur before the fourth time period.

As shown in FIG. 1G, and by reference number 165, vehicle platform 115 may process the third vehicle data and the fourth vehicle data, with the trained machine learning model, to identify a driving behavior and/or an issue associated with the particular vehicle 110. For example, vehicle platform 115 may process the third vehicle data and the fourth vehicle data to identify a driving behavior indicative of reckless driving, fatigued driving, harsh cornering, slow response times, oversteering or understeering, abrupt starts and stops, aggressive driving, and/or the like. Additionally, or alternatively, vehicle platform 115 may process the third vehicle data and the fourth vehicle data to identify an issue associated with the particular vehicle 110, such as an engine power issue (e.g., inadequate acceleration, excessive exhaust emissions, and/or the like), a fluid leak (e.g., a fuel leak, an oil leak, a transmission fluid leak, and/or the like), failing brakes, low tire pressure, a steering issue, and/or the like.

Figure 1H:
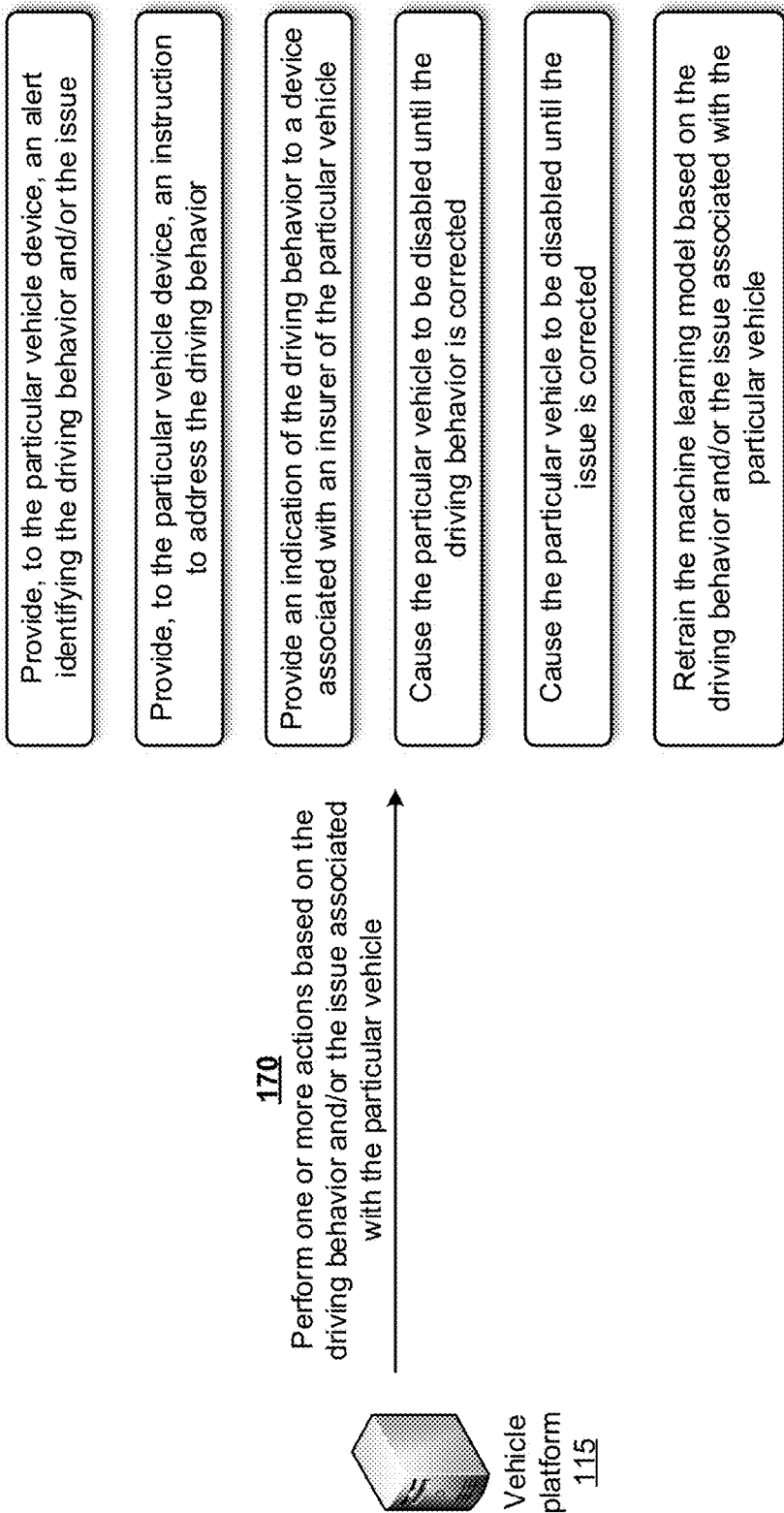

As shown in FIG. 1H, and by reference number 170, vehicle platform 115 may perform one or more actions based on the driving behavior and/or the issue associated with the particular vehicle 110. In some implementations, the one or more actions may include vehicle platform 115 providing, to the particular vehicle device 105, an alert identifying the driving behavior and/or the issue. For example, vehicle platform 115 may provide the alert (e.g., in near real-time relative to identifying the driving behavior and/or the issue associated with particular vehicle 110) by displaying an alert message and/or causing a sound to be played on a user interface of particular vehicle 110, of the particular vehicle device 105, of a user device (e.g., a smart phone) of a driver of particular vehicle 110, and/or the like. This may enable the driver to effectively adjust and/or improve driving techniques, attend to an issue associated with the particular vehicle 110, safely remove the particular vehicle 110 from a roadway, and/or the like, which may improve road safety, conserve fuel, and conserve resources that would otherwise be wasted policing poor driving behavior, handling vehicle accidents, and/or the like.

In some implementations, vehicle platform 115 may provide the alert to a user device of a passenger of the particular vehicle 110, to a computer, a user device, and/or the like associated with an owner of the particular vehicle 110 (e.g., to a parent monitoring a child's driving), to an entity (e.g., a fleet manager) responsible for the particular vehicle 110, and/or the like. This may enable other parties to assist the driver in adjusting and/or improving driving techniques, attending to an issue associated with the particular vehicle 110, and/or the like, which may improve road safety, conserve fuel, and conserve resources that would otherwise be wasted policing poor driving behavior, handling vehicle accidents, and/or the like.

In some implementations, the one or more actions may include vehicle platform 115 providing, to the particular vehicle device 105, an instruction to address the driving behavior. For example, vehicle platform 115 may instruct the driver of the particular vehicle 110 (e.g., in near real-time) to adjust a driving speed, to stop making reckless turns, to stop following other vehicles too closely, and/or the like. In this way, vehicle platform 115 may enable the driver of the particular vehicle 110 to perform corrective driving actions based on the indication of driving behavior associated with the particular vehicle 110, which may improve road safety, conserve fuel, and conserve resources that would otherwise be wasted policing poor driving behavior, handling vehicle accidents, handling insurance claims, and/or the like.

In some implementations, the one or more actions may include vehicle platform 115 providing an indication of the driving behavior to a device associated with an insurer of the particular vehicle 110. In this way, vehicle platform 115 may enable the insurer to adjust coverage and/or a cost of coverage associated with the particular vehicle 110, an owner of the particular vehicle 110, a driver of the particular vehicle 110, and/or the like. Additionally, or alternatively, the insurer may provide guidance and/or training to the driver of the particular vehicle 110 (e.g., in exchange for not increasing coverage costs) in order to reduce risks of accidents, tickets, and/or the like, which may improve road safety, conserve fuel, and conserve resources that would otherwise be wasted handling insurance claims, policing poor driving behavior, handling vehicle accidents, performing vehicle repairs, and/or the like.

In some implementations, the one or more actions may include vehicle platform 115 causing the particular vehicle 110 to be disabled until the driving behavior is corrected. In this way, vehicle platform 115 may prevent the particular vehicle 110 from being operated in a dangerous manner that risks death or injury (e.g., to the driver of the particular vehicle 110, passengers of the particular vehicle 110, other drivers, and/or the like), that risks damage to property (e.g., damage to the particular vehicle 110, damage to other vehicles, damage to physical property, and/or the like), and/or the like. This may conserve resources that would otherwise be wasted in treating injuries, repairing damage, handling vehicle accidents, handling legal actions, and/or the like.

In some implementations, the one or more actions may include vehicle platform 115 causing the particular vehicle 110 to be disabled until the issue associated with particular vehicle 110 is corrected. In this way, vehicle platform 115 may prevent the particular vehicle 110 from being operated (e.g., because it may be unsafe to operate due to the issue), which would risk death or injury (e.g., to the driver of particular vehicle 110, passengers of particular vehicle 110, other drivers, and/or the like), risk damage to property (e.g., damage to the particular vehicle 110, damage to other vehicles, damage to physical property, and/or the like), and/or the like. This may conserve resources that would otherwise be wasted in treating injuries, repairing damage, handling vehicle accidents, handling legal actions, and/or the like.

In some implementations, the one or more actions may include vehicle platform 115 retraining the machine learning model based on the driving behavior and/or the issue associated with the particular vehicle 110. In this way, vehicle platform 115 may improve the accuracy of the machine learning model in determining driving behaviors associated with vehicles 110, issues associated with vehicles 110, and/or the like, which may improve speed and efficiency of the machine learning model and conserve computing resources, networking resources, and/or the like.

In some implementations, the one or more actions may include vehicle platform 115 causing a driver training program, focused on the driving behavior, to be scheduled for the driver of the particular vehicle 110. In this way, vehicle platform 115 may automatically arrange and/or facilitate training that may improve the driving behavior, without requiring manual administrative actions or other resources to arrange for and/or facilitate the driver training program. This may conserve resources that would otherwise be wasted treating injuries, repairing damage, handling vehicle accidents, handling legal actions, and/or the like caused by the driving behavior.

In some implementations, the one or more actions may include vehicle platform 115 causing the particular vehicle 110 to operate in an autonomous mode until the driver of the particular vehicle completes particular training. For example, the particular vehicle 110 may include an autonomous mode, and vehicle platform 115 may cause the autonomous mode to be engaged, and prevent the driver from operating the particular vehicle 110 until vehicle platform 115 receives an indication that the driver has completed the particular training, that the driver has performed a check of a user interface of vehicle device 105 (e.g., providing a telephone call, a video call, and/or the like), and/or the like. In this way, vehicle platform 115 may conserve resources that would otherwise be wasted treating injuries, repairing damage, handling vehicle accidents, handling legal actions, and/or the like caused by the driver.

Although implementations are described herein in connection with collecting vehicle data to train a machine learning model to identify driving behavior or a vehicle issue, the implementations described herein may be utilized with any system (e.g., an Internet of things (IoT) system) that may benefit from managing data collection based on network constraints, constraints associated with IoT devices, data collection constraints, and/or the like.

In this way, several different stages of the process for collecting vehicle data to train a machine learning model to identify a driving behavior or a vehicle issue are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that collects vehicle data to train a machine learning model to identify a driving behavior or a vehicle issue in the manner described herein. Finally, the process for collecting vehicle data to train a machine learning model to identify a driving behavior or a vehicle issue conserves computing resources, networking resources, and/or the like that would otherwise be wasted in capturing vehicle data, transmitting the vehicle data, storing the vehicle data, processing the vehicle data, and/or the like.

As indicated above, FIGS. 1A-1H are provided merely as examples. Other examples may differ from what was described with regard to FIGS. 1A-1H. The number and arrangement of devices and networks shown in FIGS. 1A-1H are provided as an example. In practice, there may be additional devices and/or networks, fewer devices and/or networks, different devices and/or networks, or differently arranged devices and/or networks than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) of FIGS. 1A-1H may perform one or more functions described as being performed by another set of devices of FIGS. 1A-1H.

Figure 2:
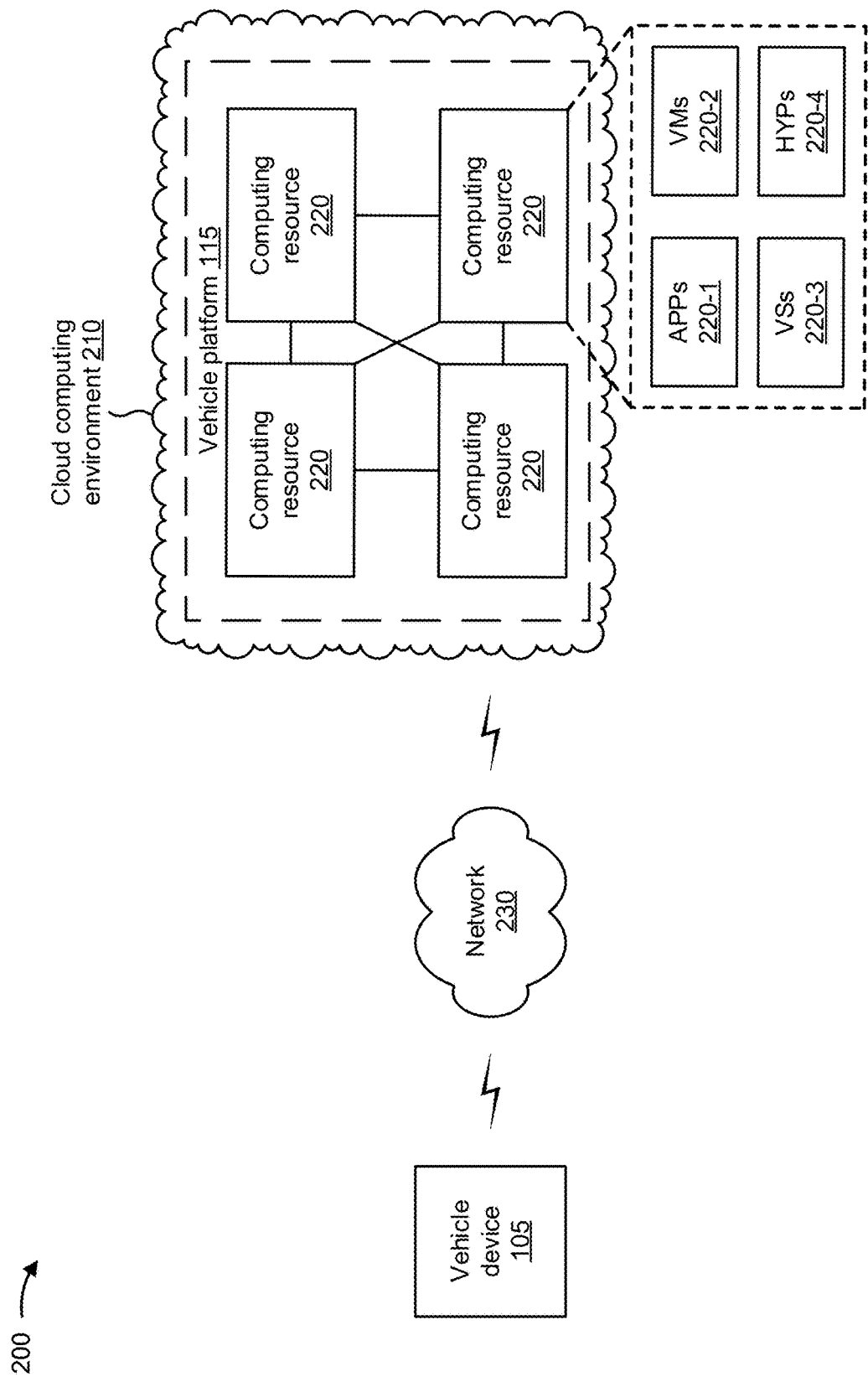
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include vehicle device 105, vehicle platform 115, and a network 230. Devices of environment 200 may interconnect via wired connections, wireless connections, or a combination of wired and wireless connections.

Vehicle device 105 includes one or more devices capable of receiving, generating, storing, processing, and/or providing information, such as information described herein. For example, vehicle device 105 may include a mobile phone (e.g., a smart phone, a radiotelephone, etc.), a laptop computer, a tablet computer, a handheld computer, a device included in vehicle 110 (e.g., an inertial measurement unit, a three-axis accelerometer, a global positioning system (GPS) device, an OBD device, an ECU, a dash camera, a parking assist camera, a backup assist camera, and/or the like) or a similar type of device. In some implementations, one or more vehicle devices 105 may utilize machine learning to identify vehicle surroundings, route conditions, and/or points of interest based on captured images or video. In some implementations, vehicle device 105 may receive information from and/or transmit information to vehicle platform 115.

Vehicle platform 115 includes one or more devices that collect vehicle data to train a machine learning model to identify a driving behavior or a vehicle issue. In some implementations, vehicle platform 115 may be designed to be modular such that certain software components may be swapped in or out depending on a particular need. As such, vehicle platform 115 may be easily and/or quickly reconfigured for different uses. In some implementations, vehicle platform 115 may receive information from and/or transmit information to one or more vehicle devices 105.

In some implementations, as shown, vehicle platform 115 may be hosted in a cloud computing environment 210. Notably, while implementations described herein describe vehicle platform 115 as being hosted in cloud computing environment 210, in some implementations, vehicle platform 115 may not be cloud-based (i.e., may be implemented outside of a cloud computing environment) or may be partially cloud-based.

Cloud computing environment 210 includes an environment that hosts vehicle platform 115. Cloud computing environment 210 may provide computation, software, data access, storage, etc., services that do not require end-user knowledge of a physical location and configuration of system(s) and/or device(s) that hosts vehicle platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host vehicle platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by vehicle device 105. Application 220-1 may eliminate a need to install and execute the software applications on vehicle device 105. For example, application 220-1 may include software associated with vehicle platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of vehicle device 105 or an operator of vehicle platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
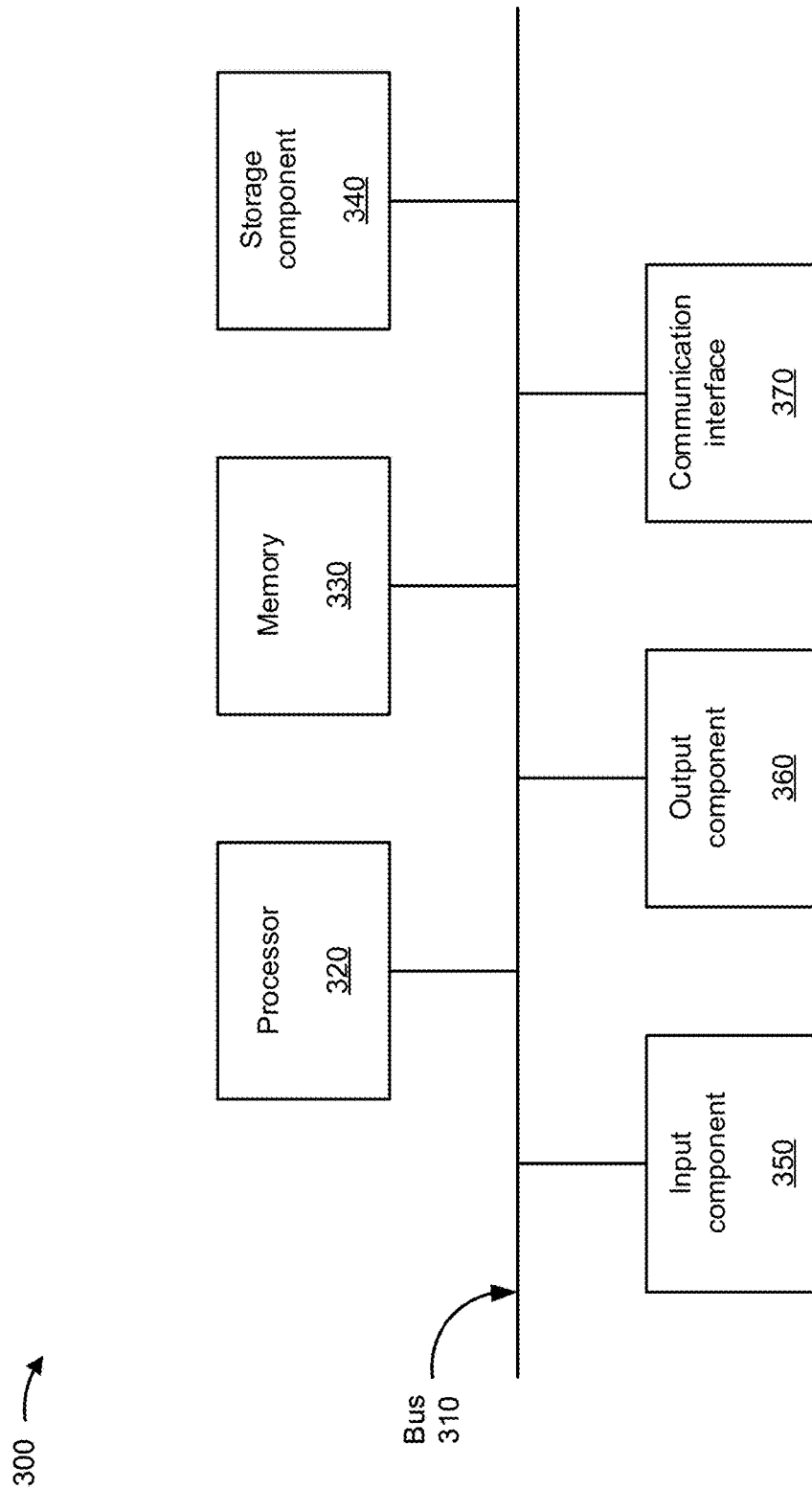
FIG. 3 is a diagram of example components of one or more devices of FIG. 2.

FIG. 3 is a diagram of example components of a device 300. Device 300 may correspond to vehicle device 105, vehicle platform 115, and/or computing resource 220. In some implementations, vehicle device 105, vehicle platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for collecting vehicle data to train a machine learning model to identify a driving behavior or a vehicle issue. In some implementations, one or more process blocks of FIG. 4 may be performed by a device (e.g., vehicle platform 115). In some implementations, one or more process blocks of FIG. 4 may be performed by another device or a group of devices separate from or including the device, such as a vehicle device (e.g., vehicle device 105).

As shown in FIG. 4, process 400 may include receiving data identifying network constraints associated with networks connected to vehicle devices of vehicles, and data identifying data collection constraints (block 405). For example, the device (e.g., using computing resource 220, processor 320, communication interface 370, and/or the like) may receive data identifying network constraints associated with networks connected to vehicle devices of vehicles, and data identifying data collection constraints, as described above. The data identifying the data collection constraints may include data identifying processing capabilities and memory capabilities of the device. The data identifying the network constraints associated with the networks may include data identifying network traffic loads associated with the networks, bandwidths of the networks, throughputs of the networks, or latencies of the networks.

As further shown in FIG. 4, process 400 may include receiving, from the vehicle devices, data identifying vehicle device constraints associated with the vehicle devices (block 410). For example, the device (e.g., using computing resource 220, processor 320, communication interface 370, and/or the like) may receive, from the vehicle devices, data identifying vehicle device constraints associated with the vehicle devices, as described above. The data identifying the vehicle device constraints may include data identifying battery lives of batteries powering the vehicle devices, data transmission rates of the vehicle devices, or average battery consumption limitations of the batteries.

As further shown in FIG. 4, process 400 may include determining first sampling rates, first time periods, second sampling rates, and second time periods for collecting vehicle data from the vehicle devices based on the data identifying the network constraints, the data identifying the data collection constraints, and the data identifying the vehicle device constraints, wherein the first sampling rates are different than the second sampling rates (block 415). For example, the device (e.g., using computing resource 220, processor 320, memory 330, and/or the like) may determine first sampling rates, first time periods, second sampling rates, and second time periods for collecting vehicle data from the vehicle devices based on the data identifying the network constraints, the data identifying the data collection constraints, and the data identifying the vehicle device constraints, as described above. In some implementations, the first sampling rates may be different than the second sampling rates.

As further shown in FIG. 4, process 400 may include receiving, from the vehicle devices, first vehicle data, provided at the first sampling rates and for the first time periods, and second vehicle data, provided at the second sampling rates and for the second time periods (block 420). For example, the device (e.g., using computing resource 220, processor 320, communication interface 370, and/or the like) may receive, from the vehicle devices, first vehicle data, provided at the first sampling rates and for the first time periods, and second vehicle data, provided at the second sampling rates and for the second time periods, as described above. The first sampling rates may be greater than the second sampling rates, and a quantity of data points of the first vehicle data may be greater than a quantity of data points of the second vehicle data. One or more of the first sampling rates and one or more of the second sampling rates may be different for corresponding one or more of the vehicle devices. The first vehicle data may be compressed prior to being transmitted by the vehicle devices.

As further shown in FIG. 4, process 400 may include training a machine learning model with the first vehicle data and the second vehicle data to generate a trained machine learning model (block 425). For example, the device (e.g., using computing resource 220, processor 320, storage component 340, and/or the like) may train a machine learning model with the first vehicle data and the second vehicle data to generate a trained machine learning model, as described above.

As further shown in FIG. 4, process 400 may include receiving data identifying particular network constraints associated with a particular network connected to a particular vehicle device of a particular vehicle (block 430). For example, the device (e.g., using computing resource 220, processor 320, communication interface 370, and/or the like) may receive data identifying particular network constraints associated with a particular network connected to a particular vehicle device of a particular vehicle, as described above.

As further shown in FIG. 4, process 400 may include receiving, from the particular vehicle device, data identifying particular vehicle device constraints associated with the particular vehicle device (block 435). For example, the device (e.g., using computing resource 220, processor 320, communication interface 370, and/or the like) may receive, from the particular vehicle device, data identifying particular vehicle device constraints associated with the particular vehicle device, as described above.

As further shown in FIG. 4, process 400 may include determining a third sampling rate, a third time period, a fourth sampling rate, and a fourth time period for collecting vehicle data from the particular vehicle device based on the data identifying the particular network constraints, the data identifying the data collection constraints, and the data identifying the particular vehicle device constraints (block 440). For example, the device (e.g., using computing resource 220, processor 320, memory 330, and/or the like) may determine a third sampling rate, a third time period, a fourth sampling rate, and a fourth time period for collecting vehicle data from the particular vehicle device based on the data identifying the particular network constraints, the data identifying the data collection constraints, and the data identifying the particular vehicle device constraints, as described above.

As further shown in FIG. 4, process 400 may include receiving, from the particular vehicle device, third vehicle data, provided at the third sampling rate and for the third time period, and fourth vehicle data, provided at the fourth sampling rate and for the fourth time period, wherein the third sampling rate is different than the fourth sampling rate (block 445). For example, the device (e.g., using computing resource 220, processor 320, communication interface 370, and/or the like) may receive, from the particular vehicle device, third vehicle data, provided at the third sampling rate and for the third time period, and fourth vehicle data, provided at the fourth sampling rate and for the fourth time period, as described above. In some implementations, the third sampling rate may be different than the fourth sampling rate. The third sampling rate may be greater than the fourth sampling rate, and a quantity of data points of the third vehicle data may be greater than a quantity of data points of the fourth vehicle data.

The third vehicle data and the fourth vehicle data may include data identifying global positioning system coordinates associated with the particular vehicle, an odometer reading associated with the particular vehicle, an engine speed associated with the particular vehicle, a vehicle speed associated with the particular vehicle, an engine torque associated with the particular vehicle, a lateral acceleration associated with the particular vehicle, a brake pedal switch count associated with the particular vehicle, a brake pedal time while moving associated with the particular vehicle, a brake pedal time associated with the particular vehicle, a driver seatbelt fastened associated with the particular vehicle, fuel consumption associated with the particular vehicle, or a battery voltage associated with the particular vehicle. The third vehicle data may be compressed prior to being transmitted by the particular vehicle device.

As further shown in FIG. 4, process 400 may include processing the third vehicle data and the fourth vehicle data, with the trained machine learning model, to identify a driving behavior or an issue associated with the particular vehicle (block 450). For example, the device (e.g., using computing resource 220, processor 320, memory 330, storage component 340, and/or the like) may process the third vehicle data and the fourth vehicle data, with the trained machine learning model, to identify a driving behavior or an issue associated with the particular vehicle, as described above.

As further shown in FIG. 4, process 400 may include performing one or more actions based on the driving behavior or the issue associated with the particular vehicle (block 455). For example, the device (e.g., using computing resource 220, processor 320, memory 330, storage component 340, communication interface 370, and/or the like) may perform one or more actions based on the driving behavior or the issue associated with the particular vehicle, as described above. In some implementations, performing the one or more actions may include providing, to the particular vehicle device, an alert identifying the driving behavior or the issue associated with the particular vehicle; providing, to the particular vehicle device, an instruction to address the driving behavior; or providing an indication of the driving behavior to a device associated with an insurer of the particular vehicle.

In some implementations, performing the one or more actions may include causing the particular vehicle to be disabled until the issue associated with the particular vehicle is corrected, or retraining the machine learning model based on the driving behavior or the issue associated with the particular vehicle. In some implementations, performing the one or more actions may include causing a driver training program, focused on the driving behavior, to be scheduled for a driver of the particular vehicle, or causing the particular vehicle to operate in an autonomous mode until the driver of the particular vehicle completes particular training or until the driver has performed a check of a user interface of the particular vehicle device.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method comprising:
receiving, by a device, data identifying network constraints associated with networks connected to vehicle devices of vehicles, and data identifying data collection constraints;
receiving, by the device and from the vehicle devices, data identifying vehicle device constraints associated with the vehicle devices;
determining, by the device, first sampling rates, first time periods, second sampling rates, and second time periods for collecting vehicle data from the vehicle devices based on the data identifying the network constraints, the data identifying the data collection constraints, and the data identifying the vehicle device constraints, wherein the first sampling rates are different than the second sampling rates;

receiving, by the device and from the vehicle devices, first vehicle data, provided at the first sampling rates and for the first time periods, and second vehicle data, provided at the second sampling rates and for the second time periods;

training, by the device, a machine learning model with the first vehicle data and the second vehicle data to generate a trained machine learning model;

receiving, by a device, data identifying particular network constraints associated with a particular network connected to a particular vehicle device of a particular vehicle;

receiving, by the device and from the particular vehicle device, data identifying particular vehicle device constraints associated with the particular vehicle device;

determining, by the device, a third sampling rate, a third time period, a fourth sampling rate, and a fourth time period for collecting vehicle data from the particular vehicle device based on the data identifying the particular network constraints, the data identifying the data collection constraints, and the data identifying the particular vehicle device constraints;

receiving, by the device and from the particular vehicle device, third vehicle data, provided at the third sampling rate and for the third time period, and fourth vehicle data, provided at the fourth sampling rate and for the fourth time period,
wherein the third sampling rate is different than the fourth sampling rate;

processing, by the device, the third vehicle data and the fourth vehicle data, with the trained machine learning model, to identify a driving behavior or an issue associated with the particular vehicle; and performing, by the device, one or more actions based on the driving behavior or the issue associated with the particular vehicle.

2. The method of claim 1, wherein the first sampling rates are greater than the second sampling rates, and
wherein a quantity of data points of the first vehicle data is greater than a quantity of data points of the second vehicle data.

3. The method of claim 1, wherein the third sampling rate is greater than the fourth sampling rate, and
wherein a quantity of data points of the third vehicle data is greater than a quantity of data points of the fourth vehicle data.

4. The method of claim 1, wherein performing the one or more actions comprises one or more of:
providing, to the particular vehicle device, an alert identifying the driving behavior or the issue associated with the particular vehicle;
providing, to the particular vehicle device, an instruction to address the driving behavior; or
providing an indication of the driving behavior to a device associated with an insurer of the particular vehicle.

5. The method of claim 1, wherein performing the one or more actions comprises one or more of:
causing the particular vehicle to be disabled until the driving behavior is corrected;
causing the particular vehicle to be disabled until the issue associated with the particular vehicle is corrected; or
retraining the machine learning model based on the driving behavior or the issue associated with the particular vehicle.

6. The method of claim 1, wherein performing the one or more actions comprises one or more of:
causing a driver training program, focused on the driving behavior, to be scheduled for a driver of the particular vehicle; or
causing the particular vehicle to operate in an autonomous mode until the driver of the particular vehicle completes particular training or until the driver has performed a check of a user interface of the particular vehicle device.

7. The method of claim 1, wherein the third vehicle data and the fourth vehicle data include data identifying one or more:
global positioning system coordinates associated with the particular vehicle,
an odometer reading associated with the particular vehicle,
an engine speed associated with the particular vehicle,
a vehicle speed associated with the particular vehicle,
an engine torque associated with the particular vehicle,
a lateral acceleration associated with the particular vehicle,
a brake pedal switch count associated with the particular vehicle,
a brake pedal time while moving associated with the particular vehicle,
a brake pedal time associated with the particular vehicle,
a driver seatbelt fastened associated with the particular vehicle,
fuel consumption associated with the particular vehicle, or
a battery voltage associated with the particular vehicle.

8. A device, comprising:
one or more memories; and
one or more processors, communicatively coupled to the one or more memories, configured to:
receive data identifying network constraints associated with a network connected to a vehicle device of a vehicle, and data identifying data collection constraints;
receive, from the vehicle device, data identifying vehicle device constraints associated with the vehicle device;
determine a first sampling rate, a first time period, a second sampling rate, and a second time period for collecting vehicle data from the vehicle device based on the data identifying the network constraints, the data identifying the data collection constraints, and the data identifying the vehicle device constraints,
wherein the first sampling rate is different than the second sampling rate;
receive, from the vehicle device, first vehicle data, provided at the first sampling rate and for the first time period, and second vehicle data, provided at the second sampling rate and for the second time period;
process the first vehicle data and the second vehicle data, with a machine learning model, to identify a driving behavior or an issue associated with the vehicle,
wherein the machine learning model is trained with first historical vehicle data and second historical vehicle data,
wherein the first historical vehicle data is provided, by a plurality of vehicle devices, at first historical sampling rates and for first historical time periods, and wherein the second historical vehicle data is provided, by the plurality of vehicle devices, at second historical sampling rates and for second historical time periods; and perform one or more actions based on the driving behavior or the issue associated with the vehicle.

9. The device of claim 8, wherein the data identifying the data collection constraints includes data identifying processing capabilities and memory capabilities of the device.

10. The device of claim 8, wherein the data identifying the network constraints associated with the network includes data identifying one or more of:
a network traffic load associated with the network,
a bandwidth of the network,
a throughput of the network, or
a latency of the network.

11. The device of claim 8, wherein the data identifying the vehicle device constraints includes data identifying one or more of:
a battery life of a battery powering the vehicle device,
a data transmission rate of the vehicle device, or
an average battery consumption limitation of the battery.

12. The device of claim 8, wherein the first vehicle data is compressed prior to being transmitted by the vehicle device.

13. The device of claim 8, wherein one or more of the first historical sampling rates and one or more of the second historical sampling rates are different for corresponding one or more of the plurality of vehicle devices.

14. The device of claim 8, wherein the first historical vehicle data is compressed prior to being transmitted by the plurality of vehicle devices.

15. A non-transitory computer-readable medium storing instructions, the instructions comprising:
one or more instructions that, when executed by one or more processors, cause the one or more processors to:
receive data identifying network constraints associated with networks connected to vehicle devices of vehicles, and data identifying data collection constraints;
receive, from the vehicle devices, data identifying vehicle device constraints associated with the vehicle devices;
determine first sampling rates, first time periods, second sampling rates, and second time periods for collecting vehicle data from the vehicle devices based on the data identifying the network constraints, the data identifying the data collection constraints, and the data identifying the vehicle device constraints,
wherein the first sampling rates are different than the second sampling rates;
receive, from the vehicle devices, first vehicle data, provided at the first sampling rates and for the first time periods, and second vehicle data, provided at the second sampling rates and for the second time periods;
train a machine learning model with the first vehicle data and the second vehicle data to generate a trained machine learning model;
receive data identifying particular network constraints associated with a particular network connected to a particular vehicle device of a particular vehicle;
receive, from the particular vehicle device, data identifying particular vehicle device constraints associated with the particular vehicle device;

determine a third sampling rate, a third time period, a fourth sampling rate, and a fourth time period for collecting vehicle data from the particular vehicle device based on the data identifying the particular network constraints, the data identifying the data collection constraints, and the data identifying the particular vehicle device constraints,
wherein the third sampling rate is different than the fourth sampling rate;
receive, from the particular vehicle device, third vehicle data, provided at the third sampling rate and for the third time period, and fourth vehicle data, provided at the fourth sampling rate and for the fourth time period;
process the third vehicle data and the fourth vehicle data, with the trained machine learning model, to identify a driving behavior or an issue associated with the particular vehicle; and
perform one or more actions based on the driving behavior or the issue associated with the particular vehicle,
wherein the one or more actions include one or more of:
providing, to the particular vehicle device, an alert identifying the driving behavior or the issue associated with the particular vehicle,
providing, to the particular vehicle device, an instruction to address the driving behavior, or
providing an indication of the driving behavior to a device associated with an insurer of the particular vehicle.

16. The non-transitory computer-readable medium of claim 15, wherein the third sampling rate is greater than the fourth sampling rate, and
wherein a quantity of data points of the third vehicle data is greater than a quantity of data points of the fourth vehicle data.

17. The non-transitory computer-readable medium of claim 15, wherein the one or more instructions, that cause the one or more processors to perform the one or more actions, cause the one or more processors to one or more of:
cause the particular vehicle to be disabled until the driving behavior is corrected;
cause the particular vehicle to be disabled until the issue associated with the particular vehicle is corrected;
cause a driver training program, focused on the driving behavior, to be scheduled for a driver of the particular vehicle; or
cause the particular vehicle to operate in an autonomous mode until the driver of the particular vehicle completes particular training.

18. The non-transitory computer-readable medium of claim 15, wherein the machine learning model includes a random forest machine learning model.

19. The non-transitory computer-readable medium of claim 15, wherein the data identifying the particular network constraints associated with the particular network includes data identifying one or more of:
a network traffic load associated with the particular network,
a bandwidth of the particular network,
a throughput of the particular network, or
a latency of the particular network.

20. The non-transitory computer-readable medium of claim 15, wherein the data identifying particular vehicle device constraints includes data identifying one or more of:

a battery life of a battery powering the particular vehicle device, a data transmission rate of the particular vehicle device, or an average battery consumption limitation of the battery.

\* \* \* \* \*